(12) United States Patent
Eser et al.

(10) Patent No.: US 10,273,893 B2
(45) Date of Patent: Apr. 30, 2019

(54) SYSTEM AND METHOD FOR OPERATION OF AN INTERNAL COMBUSTION ENGINE

(71) Applicant: Continental Automotive GmbH, Hannover (DE)

(72) Inventors: Gerhard Eser, Hemau (DE); Sirko Schlegel, Neutraubling (DE); Sushman Dinka-Honnappa, Bangalore (IN)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 365 days.

(21) Appl. No.: 15/027,035

(22) PCT Filed: Aug. 4, 2014

(86) PCT No.: PCT/EP2014/066746
§ 371 (c)(1),
(2) Date: Apr. 4, 2016

(87) PCT Pub. No.: WO2015/049073
PCT Pub. Date: Apr. 9, 2015

(65) Prior Publication Data
US 2016/0237929 A1    Aug. 18, 2016

(30) Foreign Application Priority Data

Oct. 4, 2013  (DE) .................. 10 2013 220 117

(51) Int. Cl.
*F01N 3/20* (2006.01)
*F01N 11/00* (2006.01)
(Continued)

(52) U.S. Cl.
CPC ........... *F02D 41/0085* (2013.01); *F01N 3/20* (2013.01); *F01N 11/007* (2013.01);
(Continued)

(58) Field of Classification Search
CPC ............. F02D 41/0085; F02D 41/2474; F02D 41/2454; F02D 41/2458; F02D 41/008;
(Continued)

(56) References Cited

U.S. PATENT DOCUMENTS

| 4,502,444 A | * | 3/1985 | Rubbo | ................ F02D 41/2474 123/695 |
| 5,375,415 A | * | 12/1994 | Hamburg | ............ F02D 41/1476 123/681 |

(Continued)

FOREIGN PATENT DOCUMENTS

| DE | 19846393 A1 | 4/2000 | ............. F02D 41/00 |
| DE | 19903721 C1 | 7/2000 | ............. F02D 41/00 |

(Continued)

OTHER PUBLICATIONS

Korean Office Action, Application No. 2017037168436, 6 pages, dated May 29, 2017.
(Continued)

*Primary Examiner* — Sizo B Vilakazi
*Assistant Examiner* — Brian R Kirby
(74) *Attorney, Agent, or Firm* — Slayden Grubert Beard PLLC (57) ABSTRACT

A controller for an internal combustion engine may comprise a first assignment unit, an observer, a calibration unit, and a second assignment unit. The first assignment unit may determine cylinder-specific measurement signals as a function of the measurement signal from a lambda probe. The observer may include a sensor model of the lambda probe arranged in a feedback branch of the observer. The calibration unit may impress a predefined interference pattern made of cylinder-specific mixture differences and adapt, in reaction to the respectively predefined interference pattern as a function of the observer output variables related to the (Continued)

respective cylinders, an assignment rule between the measurement signal of the lambda probe and a lambda signal. The second assignment unit may carry out, by means of the assignment rule, an assignment between the measurement signal and the lambda signal.

18 Claims, 3 Drawing Sheets

(51) Int. Cl.
  *F02D 41/00* (2006.01)
  *F02D 41/14* (2006.01)
  *F02D 41/24* (2006.01)
(52) U.S. Cl.
  CPC ....... *F02D 41/008* (2013.01); *F02D 41/1454* (2013.01); *F02D 41/1476* (2013.01); *F02D 41/2454* (2013.01); *F02D 41/2458* (2013.01); *F02D 41/2474* (2013.01); *F01N 2560/02* (2013.01); *F01N 2570/145* (2013.01); *F02D 2041/1416* (2013.01)
(58) Field of Classification Search
  CPC ............. F02D 41/1476; F02D 41/1454; F02D 2041/1416; F02D 41/2464; F02D 41/2461; F01N 11/007; F01N 3/20; F01N 2560/02; F01N 2570/145
  USPC .................................. 73/23.32; 701/103, 104
  See application file for complete search history.

(56) References Cited

U.S. PATENT DOCUMENTS

| | | | | |
|---|---|---|---|---|
| 5,813,389 A * | 9/1998 | Kitamura | ............... | F02D 41/008 123/673 |
| 5,925,088 A * | 7/1999 | Nasu | ................... | F02D 41/1456 123/491 |
| 6,276,349 B1 | 8/2001 | Kofler et al. | ................. | 123/673 |
| 6,314,952 B1 * | 11/2001 | Turin | ................... | F02D 41/0085 123/673 |
| 6,325,056 B1 | 12/2001 | Weining et al. | ............... | 123/673 |
| 6,910,471 B2 | 6/2005 | Deibert et al. | ................ | 123/673 |
| 6,947,826 B2 * | 9/2005 | Deibert | ................ | F02D 41/008 123/480 |
| 7,284,545 B2 * | 10/2007 | Rosel | .................... | F02D 41/008 123/673 |
| 7,331,214 B2 * | 2/2008 | Aliakbarzadeh | ...... | F02D 41/008 73/114.72 |
| 7,676,317 B2 | 3/2010 | Aliakbarzadeh et al. | .... | 701/103 |
| 8,095,296 B2 * | 1/2012 | Kirstaetter | .......... | F02D 41/1454 123/703 |
| 8,347,700 B2 * | 1/2013 | Azadeh | ................ | F02D 41/008 73/114.31 |
| 9,255,536 B2 | 2/2016 | Eser et al. | | |
| 2003/0131588 A1 * | 7/2003 | Schnaibel | .......... | B01D 53/9431 60/284 |
| 2004/0060550 A1 * | 4/2004 | Wu | ....................... | F02D 41/123 123/694 |
| 2009/0024303 A1 * | 1/2009 | Schneider | ........... | F02D 41/0025 701/103 |
| 2009/0211350 A1 * | 8/2009 | Iwazaki | ............... | G01M 15/104 73/114.72 |
| 2011/0041819 A1 * | 2/2011 | Rodatz | ................ | F02D 41/1441 123/672 |
| 2011/0054761 A1 * | 3/2011 | Sawada | ............... | F02D 41/0085 701/103 |
| 2012/0006107 A1 * | 1/2012 | Azadeh | ................ | F02D 41/008 73/114.31 |
| 2012/0024274 A1 * | 2/2012 | Hakariya | ............ | F02D 41/0085 123/704 |
| 2013/0006506 A1 * | 1/2013 | Takada | ................ | F02D 41/0085 701/108 |
| 2013/0055786 A1 * | 3/2013 | Weiss | ................. | G01N 27/4175 73/1.07 |
| 2013/0325296 A1 * | 12/2013 | Koshi | ................. | F02D 41/0085 701/104 |
| 2014/0156205 A1 * | 6/2014 | Suzuki | ................ | F02D 41/0085 702/24 |

FOREIGN PATENT DOCUMENTS

| | | | | |
|---|---|---|---|---|
| DE | 102005009101 B3 | 3/2006 | ............. | F02D 41/14 |
| DE | 102007015362 A1 | 10/2008 | ............. | F02D 41/14 |
| DE | 102007016276 A1 | 10/2008 | ............. | F02D 41/14 |
| DE | 102007029029 A1 | 12/2008 | ............. | F02D 41/14 |
| DE | 102007045984 A1 * | 4/2009 | .......... | F02D 41/008 |
| DE | 102008058008 B3 | 2/2010 | ............. | F02D 41/00 |
| DE | 102011083781 B3 | 5/2012 | ............. | F01N 11/00 |
| EP | 0908801 A2 | 4/1999 | ............. | F02D 41/14 |
| JP | 06003304 A * | 1/1994 | | |
| JP | 06003304 A * | 1/1994 | | |
| WO | 01/59271 A1 | 8/2001 | ............. | B01D 53/86 |
| WO | 2003/004850 A1 | 1/2003 | ............. | F02D 35/00 |
| WO | 2013/045526 A1 | 4/2013 | ............. | F02D 41/00 |
| WO | 2015/049073 A1 | 4/2015 | ............. | F02D 41/00 |

OTHER PUBLICATIONS

Chinese Office Action, Application No. 201480054669.7, 15 pages, dated Sep. 28, 2017.

Van Basshuysen, Richard et al., "Handbuch Verbrennungsmotor: Grudlagen, Komponenten, Systeme, Perspektiven," ATZ/MTZ Fachbuch, pp. 559-561 (German language w/ English statement of relevance), Jun. 2002.

International Search Report and Written Opinion, Application No. PCT/EP2014/066746, 19 pages, dated Oct. 23, 2014.

* cited by examiner

SYSTEM AND METHOD FOR OPERATION OF AN INTERNAL COMBUSTION ENGINE

CROSS-REFERENCE TO RELATED APPLICATIONS

This application is a U.S. National Stage Application of International Application No. PCT/EP2014/066746 filed Aug. 4, 2014, which designates the United States of America, and claims priority to DE Application No. 10 2013 220 117.6 filed Oct. 4, 2013, the contents of which are hereby incorporated by reference in their entirety.

TECHNICAL FIELD

The present disclosure relates to internal combustion engines and, specifically, a device used for controlling the operation of an internal combustion engine.

BACKGROUND

Ever stricter legal requirements with respect to permissible emissions of pollutants of motor vehicles with internal combustion engines require emissions of pollutants to be kept as low as possible during the operation of the internal combustion engine. This can be done, on the one hand, by reducing the emissions of pollutants which occur during the combustion of the air/fuel mixture in the respective cylinders. On the other hand, exhaust gas post-treatment systems are used in internal combustion engines, said systems converting the emissions of pollutants which are produced during the combustion process of the air/fuel mixture in the respective cylinder into non-damaging substances.

For this purpose, catalytic converters are used which convert carbon monoxide, hydrocarbons, and nitrogen oxides into non-damaging substances.

Both the reduction of emission of pollutants during the combustion and the conversion of the pollutant components with a high level of efficiency by means of a catalytic converter require a very precisely set air/fuel ratio in the respective cylinder.

The manual "Handbuch Verbrennungsmotor [internal combustion engine manual]", published by Richard von Basshuysen, Fred Schafer, $2^{nd}$ Edition, Vieweg & Sohn Verlagsgesellschaft mbH, June 2002, pages 559 to 561, discloses a binary lambda control system with a binary lambda probe which is arranged upstream of the exhaust gas catalytic converter. The binary lambda control system comprises a PI controller, wherein the P and I components are stored in characteristic diagrams of the engine speed and the load. In the binary lambda control system, the excitation of the catalytic converter, also referred to as lambda fluctuation, occurs implicitly as a result of the two-point control. The amplitude of the lambda fluctuation is set to approximately 3%.

In order to satisfy legal requirements relating to the emissions of pollutants, catalytic converters are moved increasingly close to the engine. Said catalytic converters may operate well with very low tolerance in the air/fuel ratio in the individual cylinders of an exhaust gas bank, specifically a significantly lower tolerance than is the case with an arrangement of the catalytic converters remote from the engine, owing to the short mixing section from the outlet valves to the catalytic converter. In this context, a cylinder-specific lambda control can be used.

DE 19846393 A1 discloses cylinder-selective control of the air/fuel ratio in a multi-cylinder internal combustion engine having a lambda probe which is embodied as a discrete-level probe. Within the scope of the cylinder-selective control, the voltage difference of the lambda probe voltage signal of one cylinder is formed in relation to the voltage signals of the adjacent cylinders. The injection is then corrected with the difference value. This takes into account the fact that it is actually the strong change in the probe voltage in the region of the precisely stoichiometric air/fuel ratio which permits even small differences from an optimum air/fuel ratio to be detected.

DE 10 2007 015 362 A1 discloses a lambda control method in an internal combustion engine having at least one discrete-level lambda probe which is arranged in an exhaust-gas-conducting exhaust gas system of the internal combustion engine upstream of an exhaust gas purification device and which is configured to generate a first measurement signal which is dependent on the oxygen content of the exhaust gas. The first measurement signal is used and corrected at at least two points.

DE 10 2007 016 276 A1 discloses a binary lambda control system. A change of the mixture of the internal combustion engine is pilot-controlled by means of the engine control system. A stored characteristic curve of the lambda probe is adapted using the pilot-controlled changes of the mixture.

DE 10 2007 029 029 A1 describes a lambda control method in an internal combustion engine with an engine control system for mixture formation and a front lambda probe, arranged in an exhaust gas system of the internal combustion engine, for detecting a front probe signal which characterizes a front oxygen content of an exhaust gas which is conducted in the exhaust gas system, upstream of a catalytic converter arranged in the exhaust gas system. In addition, arranged upstream of the catalytic converter in the exhaust gas system is a rear lambda probe for generating a rear probe signal which characterizes a rear oxygen content of the exhaust gas which is conducted downstream of the catalytic converter in the exhaust gas system. In order to make available an improved lambda control system provision is made to determine a lambda value by means of the front probe signal and a conversion rule. In addition there is provision to determine a lambda difference from the rear probe signal and to adapt the conversion rule by means of the determined lambda difference.

WO 2013/045526 A1 discloses determining a correction signal for a fuel mass which is intended to be metered, by means of a lambda controller, in particular as a function of a measurement signal of an exhaust gas sensor. If at least one predefined condition is satisfied, within a predefined operating range of the internal combustion engine, a cylinder-specific diagnosis is carried out which relates to the emissions of pollutants on the basis of a consideration of unsmoothed running, wherein the cylinder-specific diagnosis is carried out actively only in a corresponding detection phase in which a modified integral parameter of the lambda controller is used, which integral parameter is reduced in terms of its absolute value compared to the integral parameter in a normal operating mode of the lambda controller.

DE 10 2005 009 101 B3 describes a method for determining a correction value for influencing an air/fuel ratio in a respective cylinder of an internal combustion engine having a plurality of cylinders, injection valves assigned to the cylinders and an exhaust gas probe which is arranged in an exhaust gas section and whose measurement signal is characteristic of the air/fuel ratio in the respective cylinder. At a predefined sampling crankshaft angle related to a reference position of the piston of the respective cylinder, the measurement signal is detected and assigned to the respective cylinder. A controller value for influencing the air/fuel ratio in the respective cylinder is determined by means of one controller in each case, as a function of the measurement signal detected for the respective cylinder. A first adaptation value is determined as a function of the controller value when predefined first conditions are met, said conditions including a predefined first temperature range of a temperature which is representative of a temperature of the respective injection valve and including the fact that a quasi-steady-state operating state is present. When predefined second conditions which include a predefined second temperature range of the temperature which is representative of the temperature of the respective injection valve and which include the fact that a quasi-steady-state operating state is present are satisfied, a second adaptation value is determined as a function of the controller value.

The correction value for influencing the air/fuel ratio in the respective cylinder is determined as a function of the first or second adaptation value as a function of the temperature which is representative of the temperature of the respective injection valve.

DE 10 2008 058 008 B3 describes a device for operating an internal combustion engine with a plurality of cylinders, which are each assigned an injection valve, an exhaust gas section which comprises an exhaust gas catalytic converter, and a lambda probe which is arranged upstream or in the exhaust gas catalytic converter.

An assignment unit is provided which is designed to determine cylinder-specific lambda signals as a function of the measurement signal of the lambda probe and to determine lambda difference signals for the respective cylinders as a function of the cylinder-specific lambda signals, with respect to a lambda signal which is averaged over the cylinder-specific lambda signals.

In addition, an observer is provided which comprises a sensor model of the lambda probe, which sensor model is arranged in a feedback branch of the observer. The observer is embodied such that the cylinder-specific lambda difference signals are fed to it on the input side, and observer output variables related to the respective cylinder are representative of differences of the injection characteristic of the injection valve of the respective cylinder from a predefined injection characteristic.

In addition, a parameter detection unit is provided which is designed to impress an interference pattern composed of cylinder-specific mixture differences, in reaction to the respectively predefined interference pattern, to change at least one parameter of the sensor model as a detection parameter, until at least one of the observer output variables represents, in a predefined fashion, the portion of the interference pattern which is assigned to its cylinder, and the at least one detection parameter is output.

SUMMARY OF THE INVENTION

The teachings of the present disclosure may provide a device for operating an internal combustion engine with a plurality of cylinders, which device makes a contribution to low-pollutant operation in a particularly simple way.

Some embodiments of the teachings of the present disclosure may provide a device for operating an internal combustion engine having a plurality of cylinders, each of which is assigned an injection valve, an exhaust gas section which comprises an exhaust gas catalytic converter, and a lambda probe which is arranged upstream of or in the exhaust gas catalytic converter. A first assignment unit may determine cylinder-specific measurement signals as a function of the measurement signal.

An observer comprises a sensor model of the lambda probe, which model is arranged in a feedback branch of the observer, wherein the observer is embodied in such a way that the cylinder-specific measurement signals are fed to it on the input side, and observer output variables related to the respective cylinder are made available on the output side.

In addition, corresponding sections of the measurement signal of the exhaust gas probe are assigned in a cylinder-specific fashion to the respective cylinder-specific measurement signals by means of the assignment unit.

The sensor model of the lambda probe depicts, in particular, the responder behavior thereof to changes in signals.

A calibration unit may impress a predefined interference pattern made of cylinder-specific mixture differences. It is also designed to adapt, in reaction to the respectively predefined interference pattern as a function of the observer output variables related to the respective cylinders, an assignment rule between the measurement signal of the lambda probe and a lambda signal.

In addition, a second assignment unit may carry out, by means of the assignment rule, an assignment between the measurement signal and the lambda signal.

In this way, a particularly fast and also reliable calibration can be carried out and therefore a contribution can be made to making the most precise assignment possible between the measurement signal of the lambda probe and the lambda signal. As a result of the interference pattern, it is therefore possible to determine within one working cycle observer output variables corresponding to a number of the cylinders, and therefore to use said variables to adapt the assignment rule, in particular under virtually identical remaining operating conditions, with the result that other interference influences are largely eliminated here.

By means of a suitable predefinition it is therefore possible, in particular, to ensure a very effective contribution to calibrating the assignment rule with high accuracy even outside a very narrow range around the stoichiometric air/fuel ratio with the air factor $\lambda=1$, and therefore setting the desired quantity of fuel precisely even outside operation of the internal combustion engine with a super stoichiometric or sub-stoichiometric air/fuel ratio.

In some embodiments of the calibration unit, the respectively predefined interference pattern is emission-neutral. This contributes to generating the smallest possible emissions of pollutants even during the execution of the calibration.

In some embodiments of the calibration unit, the respectively predefined interference pattern is predefined in such a way that a different air/fuel ratio is applied to at least two cylinders.

In this way, corresponding observer output variables can be determined quickly for different air/fuel ratios, and said variables can, in particular, be determined under virtually identical operating conditions, which makes an effective contribution to precise calibration of the assignment rule.

In some embodiments of the calibration unit, the respectively predefined interference pattern is predefined in such a way that a different air/fuel ratio is applied to all the assigned cylinders. It is therefore possible to set a maximum number of different air/fuel ratios per working cycle and therefore determine a maximum number of observer output variables per working cycle, which variables are assigned to these air/fuel ratios, which makes a very effective contribution to fast and precise calibration.

In some embodiments of the calibration unit, the assignment rule is adapted section-wise. In this way, respective observer output variables, which are assigned to corresponding air/fuel ratios for the respective section, are each used in a way which is specifically related to the respective sections, and in this way these sections are adapted precisely. For example, the assignment rule can comprise a characteristic curve, and this characteristic curve can be divided into individual sections.

In some embodiments of the lambda probe, a binary lambda probe has a controller unit provided with a lambda controller which is assigned to a plurality of cylinders and is embodied in such a way that a control input variable depends on the lambda signal, and that its controller actuation signal influences a fuel mass which is to be metered. This permits, in particular, a design which is as cost-effective as possible.

In some embodiments of the lambda controller, a control input variable depends on a control difference which is formed as a function of the lambda signal and a predefined setpoint signal.

The lambda controller is therefore free of a two-point controller, and the absolute value and the sign of the control difference influence the controller actuation signal. This permits, even with the binary lambda probe, particularly precise control while avoiding relatively pronounced enrichment adjustments and lean adjustments such as occur with a binary lambda controller. Furthermore, in this way a contribution is also made to carrying out the lambda control even outside the stoichiometric air/fuel ratio with the binary lambda probe, while at the same time achieving low emissions of pollutants.

In some embodiments of the controller unit, respective cylinder-specific lambda controllers contribute to equalization of an air/fuel ratio in the respective cylinders. In this way, in particular, specific differences at the injection valves or also gas inlets of the respective cylinders can be taken into account and in this way particularly precise setting of the air/fuel ratio in relation to the respective cylinder can be carried out.

In some embodiments, the calibration unit is activated if equalization of the respective air/fuel ratios has taken place in the different cylinders.

In this way, an effective contribution is made to largely eliminating influences resulting from different actual air/fuel ratios in the respective cylinders, for example owing to different characteristics of the respective injection valves or gas inlet valves, thereby permitting particularly precise calibration of the assignment rule to be carried out.

BRIEF DESCRIPTION OF THE DRAWINGS

Exemplary embodiments of the invention are explained in more detail below with reference to the schematic drawings, in which.

DETAILED DESCRIPTION

Elements with the same design or function are characterized by the same reference symbols throughout the figures.

An internal combustion engine (FIG. 1) comprises an intake section 1, an engine block 2, a cylinder head 3 and an exhaust gas section 4. The intake section 1 preferably comprises a throttle valve 5, in addition a manifold 6 and an intake pipe 7, which leads to a cylinder 71 via an inlet duct into the engine block 2. The engine block 2 also comprises a crankshaft 8, which is coupled to the piston 11 of the cylinder Z1 via a connecting rod 10.

Figure 1:
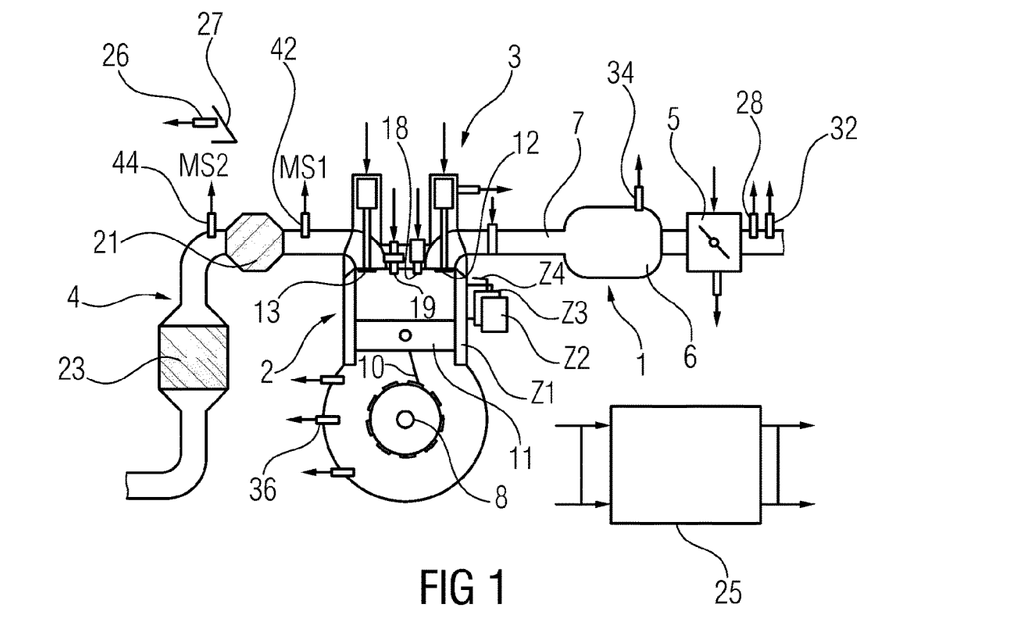
FIG. 1 shows an internal combustion engine with a control device, according to teachings of the present disclosure.

The cylinder head 3 comprises a valve drive with a gas inlet valve 12 and a gas outlet valve 13.

The cylinder head 3 also comprises an injection valve 18 and a spark plug 19. Alternatively, the injection valve 18 can also be arranged in the intake pipe 7.

An exhaust gas catalytic converter 21, which is preferably embodied as a three-way catalytic converter and which is arranged, for example, very close to the outlet to which the outlet valve 13 is assigned is arranged in the exhaust gas section 4.

In addition, a further exhaust gas catalytic converter, which is embodied, for example, as an NOx catalytic converter 23, can also be arranged in the exhaust gas section 4.

A control device 25 is provided to which sensors are assigned which detect various measurement variables and each determine the value of the measurement variable. Operating variables comprise not only measurement variables but also variables derived therefrom.

The control device 25 is designed to determine, as a function of at least one of the operating variables, actuation variables which are then converted into one or more actuation signals for controlling the actuator elements by means of corresponding servo-drives. The control device 25 can also be referred to as a device for controlling the internal combustion engine or as a device for operating the internal combustion engine.

The sensors are a pedal position signal generator 26, which detects an accelerator pedal position of an accelerator pedal 27, an air mass sensor 28, which detects an air mass flow upstream of the throttle valve 5, a first temperature sensor 32, which detects an intake air temperature, an intake pipe pressure sensor 34 which detects an intake pipe pressure in the manifold 6, and a crankshaft angle sensor 36 which detects a crankshaft angle to which a rotational speed N is then assigned.

In addition, a lambda probe 42 is provided which is arranged upstream of the exhaust gas catalytic converter 21 or in the exhaust gas catalytic converter 21 and which detects a residual oxygen content of the exhaust gas and whose measurement signal MS1 is characteristic of the air/fuel ratio in the combustion chamber of the cylinder Z1 and upstream of the lambda probe 42 before the oxidation of the fuel, referred to below as the air/fuel ratio in the cylinder Z1. The lambda probe 42 can be arranged in the exhaust gas catalytic converter in such a way that a portion of the catalytic converter volume is located upstream of the lambda probe 42. The lambda probe 42 can be embodied, for example, as a discrete-level probe, and is therefore also referred to as a binary lambda probe. The lambda probe can, for example, also be embodied as a broadband probe, which is also referred to as a linear lambda probe.

In contrast to the broadband probe, the dynamic behavior of the binary lambda probe is highly non-linear, in particular in the case of the transition phase between a lean phase and a rich phase. The evaluation of the measurement signal in the non-linear range and therefore an evaluation of the cylinder-specific lambda difference is a challenge, since the dropping or rising of the measurement signal can, under certain circumstances, take place more quickly than a time period of a working cycle, depending on the probe dynamics. Furthermore, in the transition phase, conversion of the measurement signal into a lambda signal is significantly imprecise, since the sensitivity with respect to lambda is very low in this region.

Basically, an exhaust gas probe can also be arranged downstream of the exhaust gas catalytic converter 21.

Depending on the embodiment of the invention, any desired subset of the specified sensors may be present, or additional sensors may also be present.

The actuator elements are, for example, the throttle valve 5, the gas inlet valve 12 and gas outlet valve 13, the injection valve 18 or the spark plug 19.

In addition to the cylinder Z1, further cylinders Z2 to Z4 are also provided, corresponding actuator elements and, if appropriate, sensors, then being also assigned thereto. It is therefore possible, for example to assign the cylinders Z1 to Z4, to, for example, an exhaust gas bank and to have a common lambda probe 42 assigned. Furthermore, further cylinders such as, for example, those which are assigned to a second exhaust bank, can of course also be provided. It is therefore possible for the internal combustion engine to comprise any desired number of cylinders.

Figure 2:
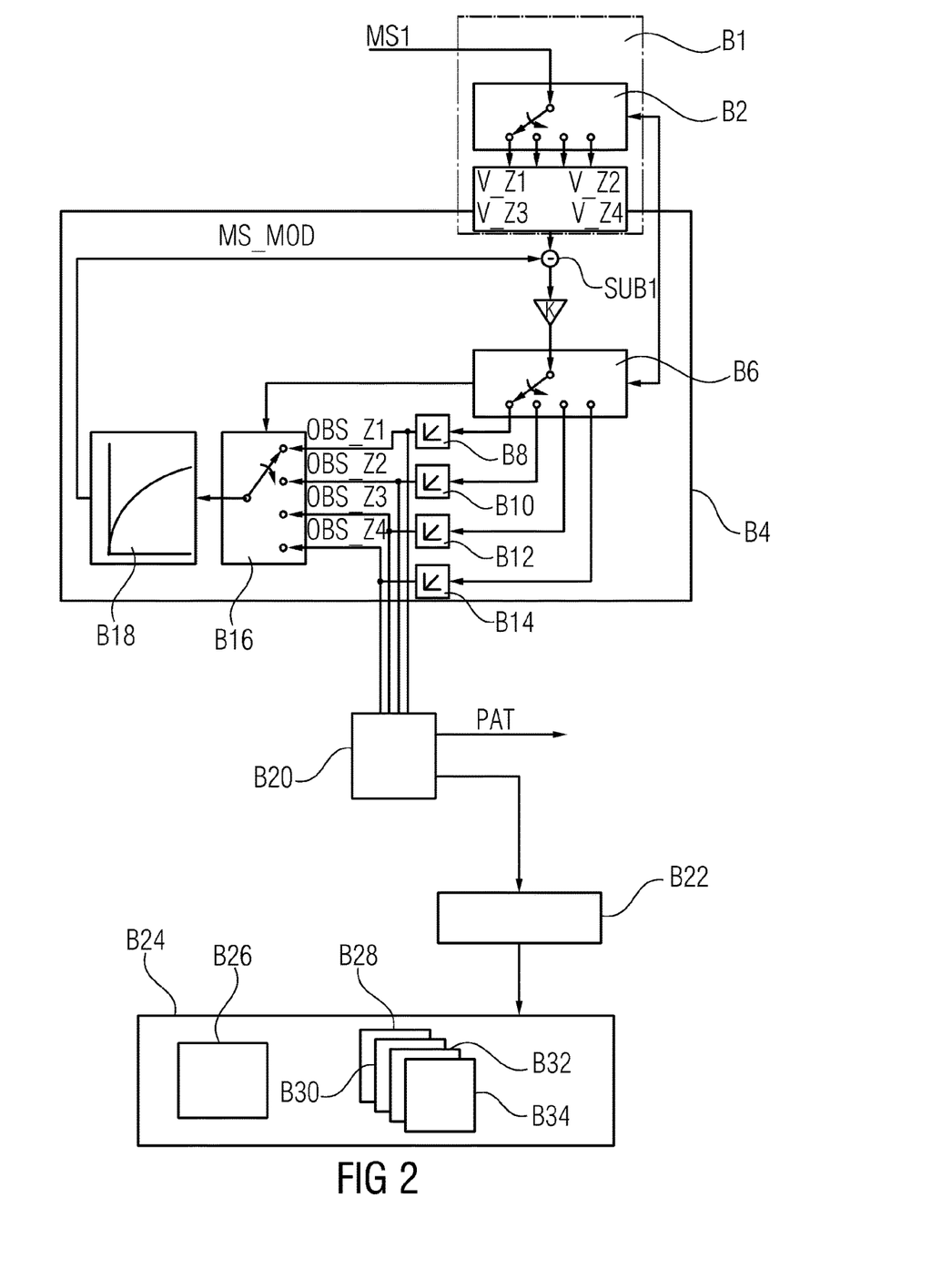
FIG. 2 shows a block diagram of relevant blocks of the control device, according to teachings of the present disclosure.

Relevant blocks of the control device 25 are explained in more detail below with reference to the block circuit diagram in FIG. 2. The blocks can comprise, for example, predefined data which is stored in a data memory of the control device and which can also comprise program code which is stored in the memory, in particular a program memory of the control device, and can be processed by computer processor(s) during the operation of the control device.

A block B1 comprises a first assignment unit which is designed to determine cylinder-specific measurement signals V_Z1, V_Z2, V_Z3 and V_Z4 as a function of the measurement signal MS1 of the lambda probe 42. In this context, in particular a block B2 is provided which comprises a changeover switch. In this way, the assignment then takes place as a function of the estimated gas running times and, if appropriate, as a function of a response behavior of the lambda probe 42. The chronological assignment is basically analogous here to the procedure during cylinder-specific lambda control, as is explained in more detail, for example, in DE 10 2008 058 008 B3, and the content of which is here correspondingly included in this respect.

The cylinder-specific measurement signals V_Z1, V_Z2, V_Z3 and V_Z4 are fed on the input side to a block B4 which comprises an observer. The cylinder-specific measurement signals V_Z1, V_Z2, V_Z3 and V_Z4 are fed to a first subtractor point SUB1 in the block B4, in which subtractor point SUB1 a difference is formed between said measurement signals V_Z1, V_Z2, V_Z3, V_Z4 and a model measurement signal MS_MOD. The model measurement signal MS_MOD is the output signal of a sensor model which is included in a block B13. This difference is then amplified in an amplifier K and subsequently fed to a block B6, which also comprises a changeover switch which is switched over in synchronism with that of the block B2.

On the output side of the block B6, the latter is coupled, depending on its switched position, to a block B8, a block B10, a block B12 or a block B14. The blocks B8 to B14 each comprise an I element, that is to say an integrating element, which integrates the signals present at its input. The output variables of the blocks B8 to B14 are observer output variables OBS_Z1, OBS_Z2, OBS_Z3, OBS_Z4, which are respectively related to the respective cylinders Z1 to Z4 in a corresponding way.

Furthermore, a further changeover switch, to which the observer output variables OBS_Z1, OBS_Z2, OBS_Z3 and OBS_Z4 are fed on the input side is provided in a block B16. The changeover switch of the block B16 is switched over in synchronism with that of the blocks B2 and B6. The output signal of the block B16 is an input variable of a block B18.

The block B18 comprises the sensor model of the lambda probe 42. This sensor module is implemented, for example, in the form of a PT1 element, but it can also comprise further elements. It comprises as parameters, for example, a gain factor and a rising time parameter. On the output side of the block B18, the model measurement signal MS_MOD is generated as an output of the sensor model. In contrast to the cylinder-specific lambda control, such as is explained in detail, for example, in DE 10 2008 058 008 B3, no assignment of the measurement signal MS1 to corresponding lambda values, that is to say conversion into a lambda signal, is carried out in the blocks B1 to B18.

In addition, a block B20 is provided which comprises a calibration unit. Furthermore, a block B22 is provided which comprises a second assignment unit. In addition, a block B24 is provided which comprises a controller unit. The controller unit comprises, in a block B26, a lambda controller which is assigned to a plurality of cylinders Z1 to Z4, that is to say, for example, to all the cylinders of an exhaust gas section.

In addition, the controller unit preferably also comprises blocks B28, B30, B32 and B34 which each comprise cylinder-specific lambda controllers. The cylinder-specific lambda controllers are embodied, for example, in a way corresponding to those which are explained in more detail in DE 10 2008 058 008 B3, and the content thereof is herewith included in this respect.

Figure 3:
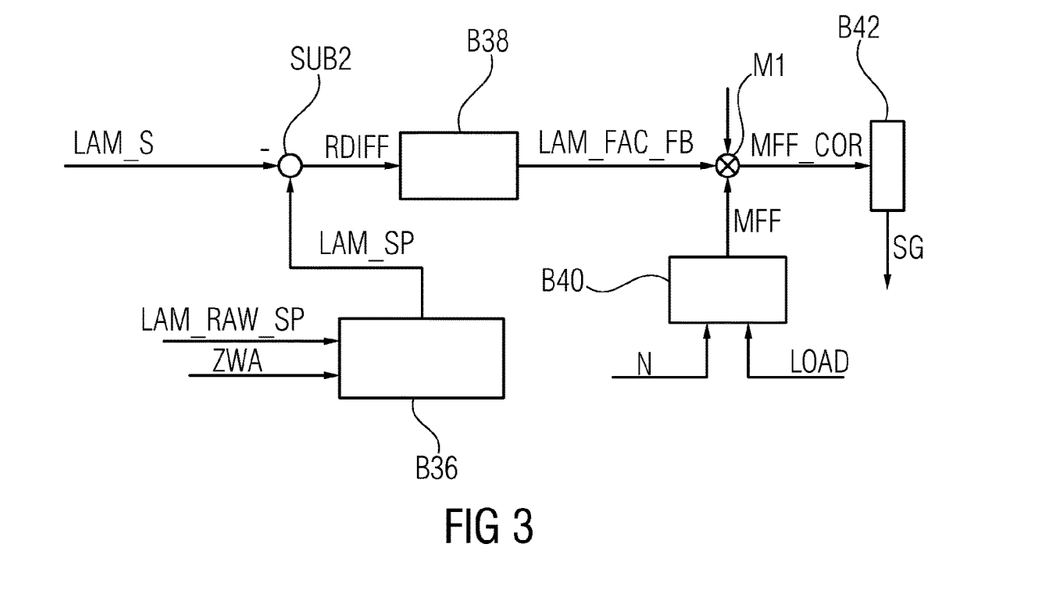
FIG. 3 shows a block diagram of a lambda controller, according to teachings of the present disclosure.

An exemplary design of the controller unit of the lambda controller in the block B26 is also explained in more detail below with reference to the block circuit diagram of FIG. 3.

A lambda signal LAM_S which is determined by means of an assignment rule, as a function of the measurement signal MS1 of the lambda probe 42, is fed to a subtractor point SUB2. The assignment rule is also explained in more detail below with reference to blocks B20 and B22.

In addition, a setpoint signal LAM_SP is fed to the subtractor point SUB2 and a difference is formed between the two, which difference is then assigned to a control difference RDIFF.

The setpoint signal LAM_SP is the output signal of a block B36 to which a raw setpoint signal LAM_RAW_SP and a forced excitation ZWA are fed on the input side. In this context, for example the raw setpoint signal LAM_RAW_SP can be predefined as a function of the operating point and represent, at an exemplary operating point, the predefinition of a stoichiometric air/fuel mixture. The forced excitation ZWA is, for example, a square-wave signal. The setpoint signal LAM_SP is determined, for example, with corresponding sum formation of the raw setpoint signal LAM_RAW_SP and the forced excitation ZWA and taking into account expected exhaust gas conduction times and/or an expected sensor behavior, in particular a response behavior.

The control difference RDIFF is fed on the input side to a block B38 which comprises a controller which can be embodied, for example, as a PID controller. However, it can basically also be embodied as any other known controller such as, for example, a P, PI or PD controller.

On the output side of the block B38, a controller actuation signal LAM_FAC_FB of the lambda controller which influences a fuel mass which is to be ultimately metered, is output. The controller actuation signal LAM_FAC_FB of the lambda controller is fed to a multiplier point M1 in which a corrected fuel mass MFF_COR which is to be metered is determined by multiplication by a fuel mass MFF which is to be metered.

A block B40 is provided in which the fuel mass MFF which is to be metered is determined as a function of, for example, the rotational speed N and the load LOAD. For this purpose, for example one or more characteristic diagrams which are determined in advance, for example of an engine test bench, can be provided.

A respective output signal of a respective cylinder-specific lambda controller can also be fed on the input side to the multiplier point M1.

A block B42 is designed to determine, as a function of the corrected fuel mass MFF_COR to be metered, an actuation signal SG, in particular for the injection valve 18 of the respective cylinder Z1 to Z4.

The calibration unit of the block B20 is configured in one refinement to be activated if equalization of the respective air/fuel ratios in the different cylinders Z1 to Z4 has taken place. This equalization takes place, in particular, with the aid of the cylinder-specific lambda controllers.

Furthermore, further conditions for the activation of the calibration unit can also be predefined. It is therefore possible, for example, for it to be necessary for the internal combustion engine to be operated in a quasi-steady-state operating state.

The calibration unit is designed to impress a predefined interference pattern PAT made of cylinder-specific mixture differences. The predefined interference pattern is preferably emission-neutral. The respectively predefined interference pattern PAT can be predefined in such a way that a different air/fuel ratio is applied to at least two cylinders. It is particularly efficient if the interference pattern PAT is predefined in such a way that a different air/fuel ratio is applied to all the assigned cylinders Z1 to Z4.

The interference pattern PAT can, for example, be embodied in such a way that the air/fuel ratio in the cylinder Z1 is lean adjusted by +10%, influenced by −10% in the cylinder Z2, that is to say enriched by 10%, lean adjusted by 5% in the cylinder Z3, and influenced by −5% in the cylinder Z4, that is to say enriched by 5%, in particular, during a general predefinition of an approximately stoichiometric air/fuel ratio. In this context, this can occur, in particular, in the form of pilot-control and can therefore be input at the multiplier point M1.

In reaction to the respectively predefined interference pattern, the assignment rule between the measurement signal MS of the lambda probe 42 and the lambda signal LAM_S is adapted as a function of the observer output variables OBS_Z1, OBS_Z2, OBS_Z3, OBS_Z4 related to the respective cylinders Z1 to Z4. In this context, in particular the information relating to the interference pattern PAT, that is to say the known enrichment adjustments or lean adjustments relating to the respective cylinders Z1 to Z4, and the resulting respective observer output variables are taken into account, and the corresponding adaptation of the assignment rule can therefore be carried out.

Figure 4:
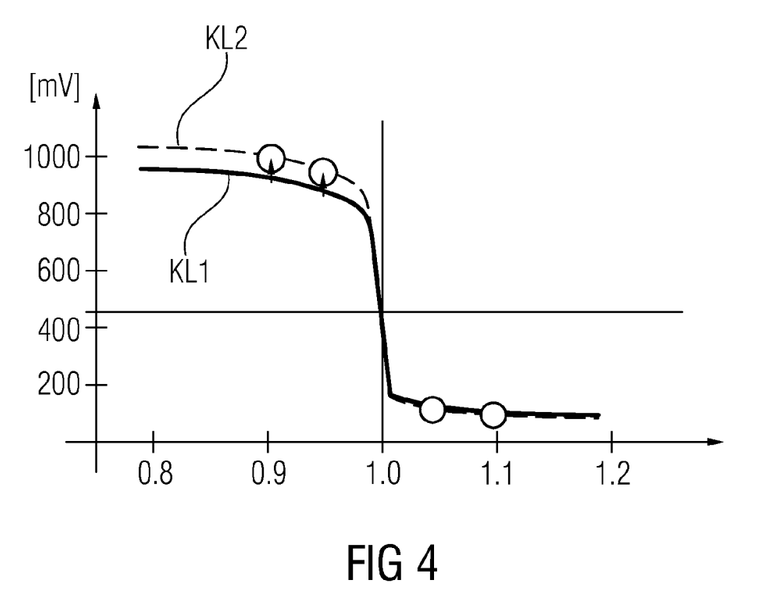
FIG. 4 shows a functional illustration of an assignment rule, according to teachings of the present disclosure.

The assignment rule preferably comprises a characteristic curve such as is illustrated, for example, in FIG. 4, wherein the Y axis represents the measurement signal MS1 as a voltage signal in millivolt [mV], and the X axis represents the air factor which is to be respectively assigned and which represents a stoichiometric air/fuel ratio at 1.0. KL1 represents the characteristic curve before the adaption, and KL2 represents the adapted characteristic curve.

For example, the adaptation of the characteristic curve KL1 can take place section-wise. It is therefore possible to adapt, for example outside the transition region around the stoichiometric air/fuel ratio, that section in the rich region by means of those observer output variables which correspond to those cylinders to which a relatively enriched mixture has been applied within the scope of the interference pattern PAT. The same applies to the respective section in the lean region of the characteristic curve KL1. Furthermore, it is also possible for other mathematical methods, such as one based on a rotation of the characteristic curve on the basis of the detected observer output variables OBS_Z1 to OBS_Z4 to be carried out as an alternative to, or in addition to, the section-wise adaptation of the assignment rule.

The adapted assignment rule can then be used in the block B22, specifically, in particular, in the second assignment unit there. By means of the adapted assignment rule, the respective measurement signal MS1 is assigned a respective lambda signal LAM_S or a cylinder-specific lambda signal, which signals can then be used in the blocks B26 or B28 to B34.

LIST OF REFERENCE SYMBOLS

1 Intake section
2 Engine block
3 Cylinder head
4 Exhaust gas section
5 Throttle valve
6 Manifold
7 Intake pipe
8 Crankshaft
10 Connecting rod
11 Piston
12 Gas inlet valve
13 Gas outlet valve
18 Injection valve
19 Spark plug
21 Exhaust gas catalytic converter
23 NOx catalytic converter
25 Control device
26 Pedal position signal generator
27 Accelerator pedal
28 Air mass sensor
32 First temperature sensor
34 Intake pipe pressure sensor
36 Crankshaft angle sensor
38 Second temperature sensor
42 Lambda probe
44 Further lambda probe
MS1 Measurement signal of the binary lambda probe
LAM_FAC_FB Controller actuation signal of the lambda controller
N Rotational speed
LOAD Load
MFF Fuel mass to be metered
MFF_COR Corrected fuel mass to be metered
SG Actuation signal
V_Z1, V_Z2, V_Z3, V_Z4 Cylinder-specific measurement signals
LAM_MOD Model measurement signal
OBS_Z1, OBS_Z2, OBS_Z3, OBS_Z4 Observer output variable which is related to the respective cylinder
PAT Interference pattern LAM_S Lambda signal
LAM_SP Setpoint signal
LAM_RAW_SP Raw setpoint signal
ZWA Forced excitation
RDIFF Control difference
KL1 Characteristic curve
KL2 Adapted characteristic curve
B1 Block (first assignment unit)
B2 Block (changeover switch)
B4 Block (observer)
K Amplifier
SUB1, SUB2 Subtractor point
B6 Block (changeover switch)
B8, B10, B12, B14 Block (I element)
B16 Block (changeover switch)
B18 Block (sensor model—PT1 element)
B20 Block (calibration unit)
B22 Block (second assignment unit)
B24 Block (controller unit)
B26 Block (lambda controller)
B28, B30, B32, B34 Block (cylinder-specific lambda controller)
B36, B38, B40, B42 Block
M1 Multiplier point

What is claimed is:

1. A device for operating an internal combustion engine having a plurality of cylinders, each of which is assigned a respective injection valve, an exhaust gas section comprising an exhaust gas catalytic converter, and a lambda probe arranged upstream of or in the exhaust gas catalytic converter and generating a measurement signal, the device comprising:
   a first assignment unit to determine cylinder specific measurement signals as a function of the measurement signal,
   an observer comprising a sensor model of the lambda probe, the sensor model arranged in a feedback branch of the observer, wherein the cylinder specific measurement signals are fed to the observer on an input side, and observer output variables related to the respective cylinders are available on the output side,
   a calibration unit operable:
      to impress a predefined interference pattern made of cylinder specific air/fuel mixture differences including at least two different air/fuel mixtures for at least two different cylinders within the same working cycle of the engine,
      to access an assignment rule between the measurement signal of the lambda probe and a lambda signal representing an air/fuel mixture ratio, and
      to adapt, in reaction to the respectively predefined interference pattern for each of the plurality of cylinders, the assignment rule between the measurement signal of the lambda probe and the lambda signal representing the air/fuel mixture ratio as a function of the observer output variables related to the respective cylinders and corresponding to the at least two different air/fuel mixtures defined by the predefined interference pattern for the at least two different cylinders within the same working cycle of the engine, and
   a second assignment unit to carry out, by means of the assignment rule, an assignment between the measurement signal and the lambda signal representing the air/fuel mixture ratio.

2. The device as claimed in claim 1, wherein the respectively predefined interference pattern is emission neutral.

3. The device as claimed in claim 1, wherein the respectively predefined interference pattern (PAT) is predefined in such a way that a different air/fuel ratio is applied to all the assigned cylinders.

4. The device as claimed in claim 1, wherein the assignment rule is adapted section wise.

5. The device as claimed in claim 1, wherein:
   the lambda probe comprises a binary lambda probe, and
   further comprising a controller unit with a lambda controller is assigned to the plurality of cylinders and a control input variable depends on the lambda signal, and a controller actuation signal influences a fuel mass to be metered.

6. The device as claimed in claim 5, wherein the control input variable depends on a control difference is formed as a function of the lambda signal and a predefined setpoint signal.

7. The device as claimed in claim 1, further comprising a controller unit with respective cylinder specific lambda controllers contributing to equalization of an air/fuel ratio in the respective cylinders.

8. The device as claimed in claim 1, wherein the calibration unit is activated if equalization of the respective air/fuel ratios has taken place in the different cylinders.

9. An internal combustion engine comprising:
   a plurality of cylinders;
   a respective injection valve metering fuel into each of the plurality of cylinders;
   an exhaust gas catalytic converter,
   a lambda probe arranged upstream of or in the exhaust gas catalytic converter generating a measurement signal,
   a first assignment unit to determine cylinder specific measurement signals as a function of the measurement signal,
   an observer comprising a sensor model of the lambda probe, the sensor model arranged in a feedback branch of the observer, wherein the cylinder specific measurement signals are fed to the observer on an input side, and observer output variables related to the respective cylinders are available on the output side,
   a calibration unit operable:
      to impress a predefined interference pattern made of cylinder specific mixture differences including at least two different air/fuel mixtures for at least two different cylinders within the same working cycle of the engine,
      to access an assignment rule between the measurement signal of the lambda probe and a lambda signal representing an air/fuel mixture ratio, and
      to adapt, in reaction to the respectively predefined interference pattern for each of the plurality of cylinders, the assignment rule between the measurement signal of the lambda probe and the lambda signal representing the air/fuel mixture ratio as a function of the observer output variables related to the respective cylinders and corresponding to the at least two different air/fuel mixtures defined by the predefined interference pattern for the at least two different cylinders within the same working cycle of the engine, and
   a second assignment unit to carry out, by means of the assignment rule, an assignment between the measurement signal and the lambda signal representing the air/fuel mixture ratio.

10. The internal combustion engine as claimed in claim 9, wherein the respectively predefined interference pattern is emission neutral.

11. The internal combustion engine as claimed in claim 9, wherein the respectively predefined interference pattern (PAT) is predefined in such a way that a different air/fuel ratio is applied to all the assigned cylinders.

12. The internal combustion engine as claimed in claim 9, wherein the assignment rule is adapted section wise.

13. The internal combustion engine as claimed in claim 9, wherein:
the lambda probe comprises a binary lambda probe, and
further comprising a controller unit with a lambda controller is assigned to the plurality of cylinders and a control input variable depends on the lambda signal, and a controller actuation signal influences a fuel mass to be metered.

14. The internal combustion engine as claimed in claim 9, wherein the control input variable depends on a control difference is formed as a function of the lambda signal and a predefined setpoint signal.

15. The internal combustion engine as claimed in claim 9, further comprising a controller unit with respective cylinder specific lambda controllers contributing to equalization of an air/fuel ratio in the respective cylinders.

16. The internal combustion engine as claimed in claim 9, wherein the calibration unit is activated if equalization of the respective air/fuel ratios has taken place in the different cylinders.

17. The device as claimed in claim 1, wherein:
the assignment rule between the measurement signal of the lambda probe and the lambda signal defines a characteristic curve between the measurement signal of the lambda probe and the lambda signal, and
adapting, by the calibration unit, the assignment rule comprises adjusting, by the calibration unit, at least one section of the characteristic curve between the measurement signal of the lambda probe and the lambda signal.

18. The internal combustion engine as claimed in claim 9, wherein:
the assignment rule between the measurement signal of the lambda probe and the lambda signal defines a characteristic curve between the measurement signal of the lambda probe and the lambda signal, and
adapting, by the calibration unit, the assignment rule comprises adjusting, by the calibration unit, at least one section of the characteristic curve between the measurement signal of the lambda probe and the lambda signal.

* * * * *